July 26, 1938. E. H. STRUTZ 2,124,835
SNAP HOOK FOR ATTACHING GRASS CATCHERS TO LAWN MOWERS
Filed Jan. 29, 1937
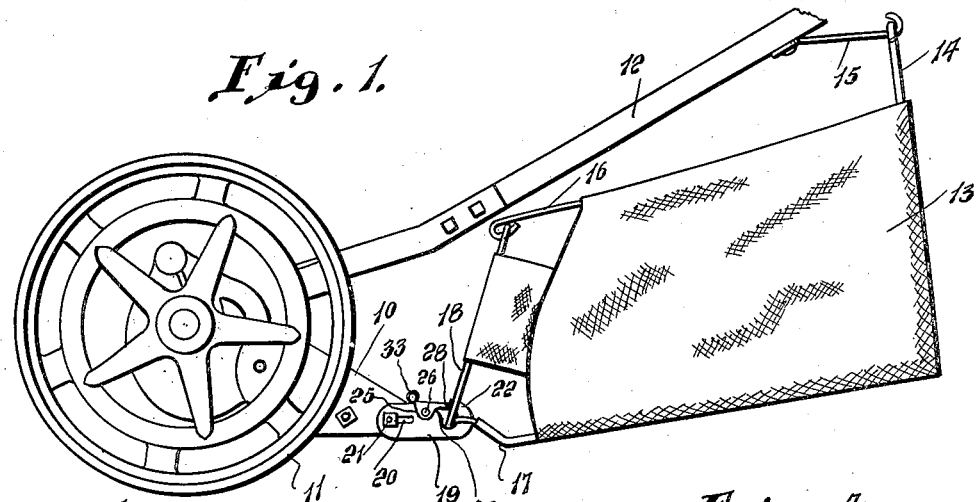
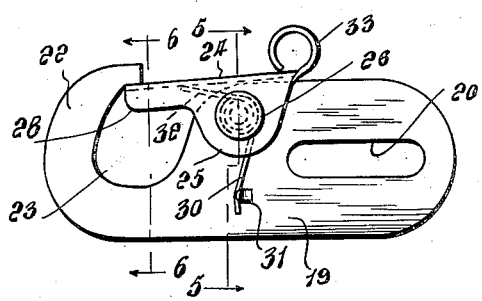
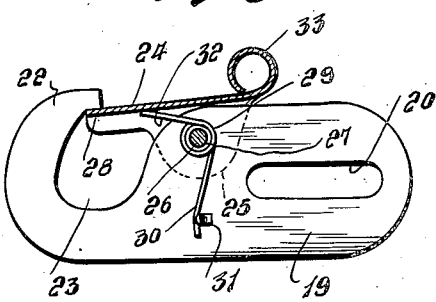
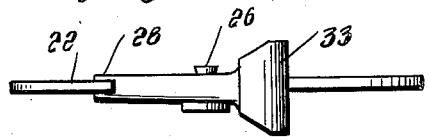
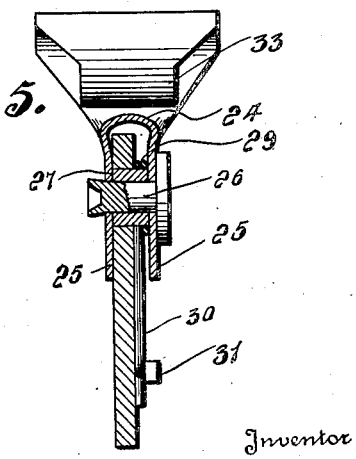
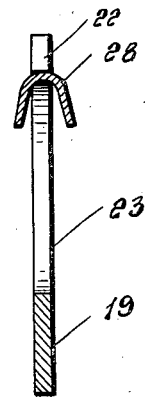
Inventor
E. H. Strutz Patented July 26, 1938

2,124,835

UNITED STATES PATENT OFFICE 2,124,835

SNAP HOOK FOR ATTACHING GRASS CATCHERS TO LAWN MOWERS

Edward Henry Strutz, Sacramento, Calif.

Application January 29, 1937, Serial No. 123,048

1 Claim. (Cl. 24—235)

This invention relates to certain new and useful improvements in a snap hook for attaching grass catchers to lawn mowers.

The primary object of the invention is to provide a novel construction of snap hook for attaching a grass catching bag to a lawn mower so that the bag will retain its proper position relative to the lawn mower when the latter is moved forwardly and backwardly over the grass, the construction of snap hook permitting rigid attachment thereof to the frame of the lawn mower which may be of a permanent character while the frame of the grass catching bag or receptacle is detachably engaged with the snap hook.

With the above and other objects in view that will become apparent as the nature of the invention is better understood, the same consists in the novel form, combination and arrangement of parts hereinafter more fully described, shown in the accompanying drawing and claim.

In the drawing:

Figure 1 is a side elevational view of a lawn mower equipped with a grass catching bag and illustrating the snap hook connection between the bag and frame of a lawn mower;

Figure 2 is a side elevational view of the snap hook;

Figure 3 is a top edge elevational view;

Figure 4 is a side elevational view with the pivoted keeper of the latch hook shown in section and illustrating the spring for tensioning the keeper;

Figure 5 is a vertical cross-sectional view taken on line 5—5 of Figure 2, showing the pivotal connection between the body of the hook and the keeper; and Figure 6 is a vertical cross-sectional view taken on line 6—6 of Figure 2.

The grass catcher is adapted for attachment to a lawn mower of ordinary construction, the latter including rearwardly extending side frame bars 10, ground wheels 11 and a handle 12.

The grass catcher includes a bag or receptacle 13 having an upwardly extending frame bar 14 at its rear end for detachable engagement with a hook 15 carried by the handle bar 12 while a snap hook that is adjustably carried by the side frame bars 10 of the lawn mower detachably supports the forward end of the receptacle 13. Upper and lower rods 16 and 17 respectively project from the forward end of the receptacle 13 at each side thereof and are connected by vertical frame rods 18, the lower ends of the frame rods 18 being detachably connected to the snap hooks carried by the side frame bars 10 as shown in Figure 1.

As shown more clearly in Figs. 2 to 6, the snap hook comprises a shank 19 of blade formation having a longitudinally extending slot adjacent one end thereof for the passage of a nut and bolt combination 21 shown in Figure 1 for adjustably connecting the snap hook to the side frame bars 10 of the lawn mower. The other end of the shank 19 of the snap hook carries a laterally extending hook bill 22 defining a pocket 23 that is normally closed by a tensioned tongue or keeper 24 that engages the inner side of the bill 22 adjacent the end thereof.

The latch keeper 24 is U-shaped in cross-section and includes a pair of side ears 25 that straddle the shank 19 adjacent the open side of the recess 23 and the pivotal mounting for the latch keeper 24 includes a pin 26 extending through openings in the ears 25 and supported in a bearing 27 as shown in Figure 5 that is seated in an opening in the shank 19 of the snap hook, the bearing 27 being disposed between the ears 25 of the keeper. A tongue extension 28 forms a part of the latch keeper 24 and is engaged with the hook bill 22 as shown in Figures 2 and 4. The latch keeper 24 is tensioned by means of a wire spring that includes a coiled portion 29 supported on the bearing 27 between the shank 19 of the latch hook and one of the ears 25, one leg 30 of the spring being engaged with a lug 31 struck out from the shank 19 of the snap hook while the other leg 32 of the spring is engaged with the underside of the latch keeper 24. The tensioning spring operates to maintain the latch tongue 28 engaged with the hook bill 22. The frame rod 18 at the lower forward end of the grass receptacle 13 is received in the recess 24 defined by the hook bill 22 and is retained therein by the latch keeper 24. To disengage the grass receptacle from the lawn mower, the finger piece 33 at the rear end of the latch keeper is manipulated for moving the latch keeper on its pivot pin 26 for spacing the latch tongue 28 from the hook bill 22 whereupon the frame rods 18 may be disengaged from the latch hooks and the rear end of the grass receptacle disengaged from the hooks 15 on the handle bar 12.

While there is herein shown and described the preferred embodiment of the invention, it is nevertheless to be understood that minor changes may be made therein without departing from the spirit and scope of the invention as claimed.

I claim:

Means for attaching a grass receptacle to a lawn mower comprising a snap hook having a blade shank with a slot at one end, a hook bill at the other end and a tensioned latch keeper pivoted on the shank and engaged with the hook bill, the latch keeper being U-shaped in cross section and having side ears straddling the shank, the pivotal mounting of the latch keeper including a pivot pin extending through the ears and shank, a tubular bearing surrounding the pin between the ends thereof and extending through the shank for end abutting engagement with the latch keeper ears, a wire spring having a coiled portion on the bearing between the shank and one ear of the keeper with one leg engaged with the keeper and an abutment on the shank in spaced relation to the adjacent ear of the latch keeper to be engaged by the other leg of the wire spring.

EDWARD HENRY STRUTZ.